United States Patent
Rosu et al.

(10) Patent No.: US 12,461,195 B2
(45) Date of Patent: Nov. 4, 2025

(54) NEAR-RANGE INTERFERENCE MITIGATION FOR AUTOMOTIVE RADAR SYSTEM

(71) Applicant: NXP B.V., Eindhoven (NL)

(72) Inventors: Filip Alexandru Rosu, Bucharest (RO); Ryan Haoyun Wu, San Jose, CA (US)

(73) Assignee: NXP B.V., Eindhoven (NL)

(*) Notice: Subject to any disclaimer, the term of this patent is extended or adjusted under 35 U.S.C. 154(b) by 362 days.

(21) Appl. No.: 18/062,618

(22) Filed: Dec. 7, 2022

(65) Prior Publication Data

US 2024/0111020 A1 Apr. 4, 2024

(30) Foreign Application Priority Data

Sep. 22, 2022 (RO) .............................. a 2022 00578

(51) Int. Cl.
*G01S 7/35* (2006.01)
*G01S 13/931* (2020.01)

(52) U.S. Cl.
CPC .............. *G01S 7/354* (2013.01); *G01S 7/356* (2021.05); *G01S 13/931* (2013.01); *G01S 2013/93275* (2020.01)

(58) Field of Classification Search
CPC .......... G01S 7/023; G01S 7/038; G01S 7/292; G01S 7/354; G01S 7/356; G01S 13/931; G01S 2013/93275
See application file for complete search history.

(56) References Cited

U.S. PATENT DOCUMENTS 7,535,410 B2    5/2009  Suzuki
11,513,187 B2*  11/2022 Stettiner ............... G01S 7/2883
(Continued)

FOREIGN PATENT DOCUMENTS

| CN | 113433523 A | 9/2021 |
| EP | 3588127 A1 | 1/2020 |
| WO | 2021177956 A1 | 9/2021 |

OTHER PUBLICATIONS

Rosu et al., "Near-Range Multipath Mitigation Methodology for Multistatic SAR Applications Using Matched-Adaptive Filters," IEEE Journal of Selected Topics in Applied Earth Observations and Remote Sensing, May 4, 2022, pp. 3204-3214, vol. 15.
(Continued)

*Primary Examiner* — Jack W Keith
*Assistant Examiner* — Clayton Paul Ridder

(57) ABSTRACT

A signal processing system and method includes a first input configured to receive an input signal range profile. The input signal range profile includes near-range interference signals. A second input is configured to receive a reference signal range profile; and a processor is configured to perform steps including: executing a recursive least squares operation to determine coefficient values of a finite impulse response (FIR) filter, wherein the coefficient values are selected to minimize a difference between the input signal range profile and the reference signal range profile when the reference signal range profile is filtered through the FIR filter to generate a filtered reference signal range profile, and subtracting the filtered reference signal range profile from the input signal range profile to remove the near-range interference signals from the input signal range profile.

20 Claims, 10 Drawing Sheets

(56) References Cited

U.S. PATENT DOCUMENTS

| | | | |
|---|---|---|---|
| 2007/0139200 A1* | 6/2007 | Yushkov | G01S 13/767 340/8.1 |
| 2009/0299184 A1* | 12/2009 | Walker | G10K 11/346 600/447 |
| 2011/0037643 A1* | 2/2011 | Torin | G01S 7/285 342/174 |
| 2012/0218139 A1 | 8/2012 | Suzuki et al. | |
| 2017/0307729 A1 | 10/2017 | Eshraghi et al. | |
| 2018/0106884 A1* | 4/2018 | Marr | G01S 7/354 |
| 2018/0252809 A1* | 9/2018 | Davis | G01S 7/0233 |
| 2021/0105019 A1* | 4/2021 | Gupta | H03M 1/1033 |
| 2021/0149018 A1 | 5/2021 | Elad et al. | |

OTHER PUBLICATIONS

Rosu et al., "Deconvolution Method for Eliminating Reference Signal Coupling/Reflections in Bistatic SAR," 2021 IEEE International Geoscience and Remote Sensing Symposium IGARSS, 2021, pp. 2715-2718.

Rosu et al., "Sub-Resolution Multipath Mitigation in Radar Transponders by Range Compression and Adaptive Filtering," 2019 International Symposium on Signals, Circuits and Systems (ISSCS), 2019, pp. 1-4.

Sornmo et al., "A Method for Evaluation of QRS Shape Features Using a Mathematical Model for the ECG," in IEEE Transactions on Biomedical Engineering, vol. BME-28, No. 10, pp. 713-717, Oct. 1981.

Hamilton et al., "Adaptive matched filtering for QRS detection," Proceedings of the Annual International Conference of the IEEE Engineering in Medicine and Biology Society, 1988, pp. 147-148 vol. 1.

Widrow et al., "Stationary and nonstationary learning characteristics of the LMS adaptive filter," in Proceedings of the IEEE, vol. 64, No. 8, pp. 1151-1162, Aug. 1976.

Melzer et al, Short-Range Leakage Cancelation in FMCW Radar Transceivers Using an Artificial On-Chip Target, Dec. 1, 2015. pp. 1650-1660 , vol. 9, IEEE Journal of Selected Topics in Signal Processing.

* cited by examiner

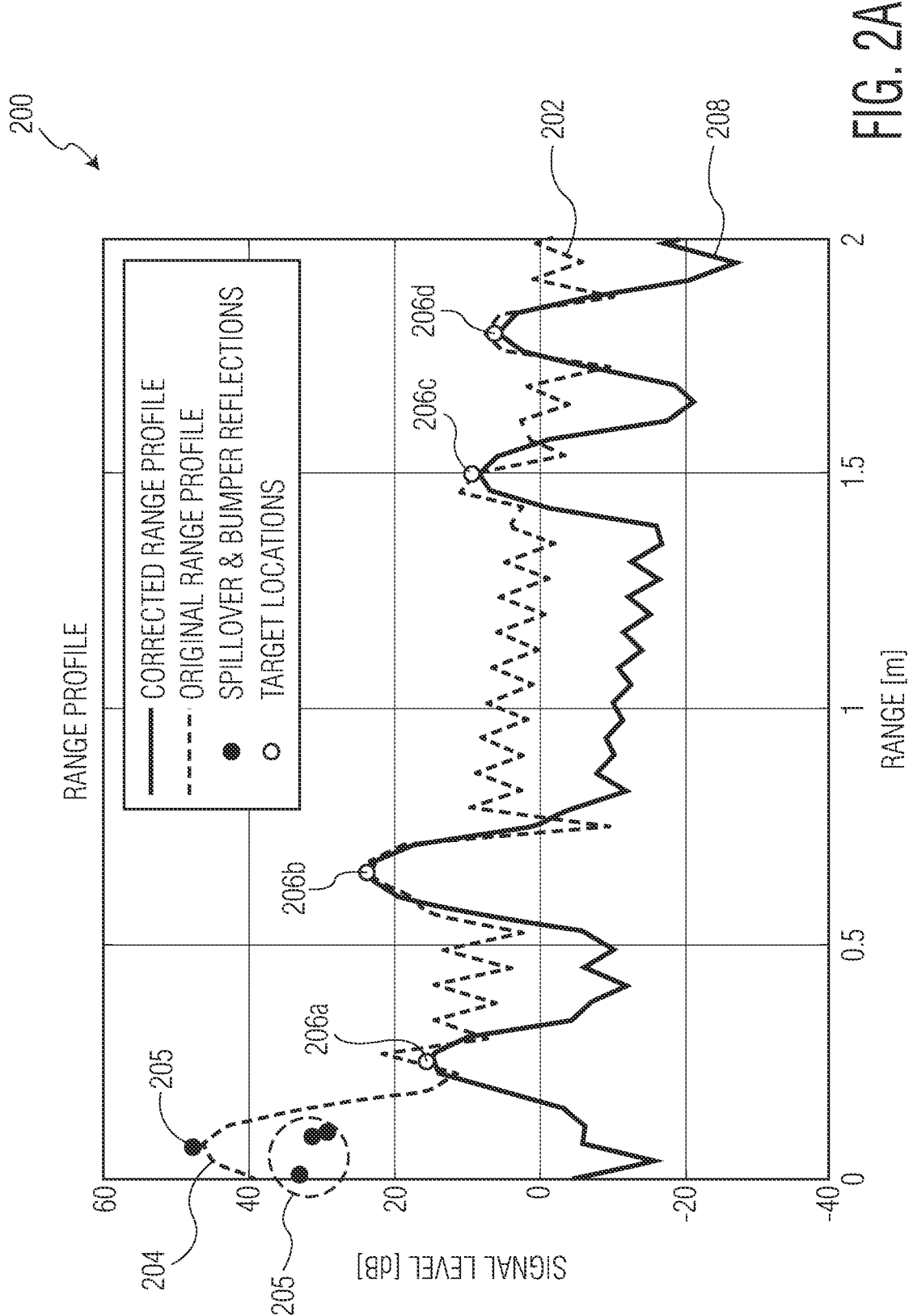

NEAR-RANGE INTERFERENCE MITIGATION FOR AUTOMOTIVE RADAR SYSTEM

TECHNICAL FIELD

The present invention is directed in general to radar systems and associated methods of operation. In one aspect, the present invention relates to an automotive radar system configured to process received radar signals to mitigate interference generated by vehicle bumper reflections and radar system component spill-over, thereby improving radar system near-range performance.

BACKGROUND

A radar system transmits an electromagnetic signal and receives back reflections of the transmitted signal. The time delay between the transmitted and received signals can be determined and used to calculate the distance and/or the speed of objects causing the reflections. For example, in automotive applications, automotive radar systems can be used to determine the distance and/or the speed of oncoming vehicles and other obstacles.

Automotive radar systems enable the implementation of advanced driver-assistance system (ADAS) functions that are likely to enable increasingly safe driving and, eventually, fully autonomous driving platforms.

Although many different types and configurations of radar systems exist, many automotive applications utilize direct-conversion frequency-modulated continuous-wave (FMCW) radars. Such systems, however, may suffer from poor near-range estimation (i.e., accurate detection of objects within about a meter of the radar antenna) due to bumper reflection (in automotive applications) and monolithic microwave integrated circuit (MMIC) and antenna coupling.

In some automotive radar systems, high-pass filters are used as a means of reducing the interference generated by transmitting-vehicle bumper reflection and component coupling, but such filters are generally unable to remove interference in the radar system's 0 iso-Doppler line in the 0 centimeter (cm) to 15 cm range, resulting in poor detection of objects and corresponding detection of targets that are within a meter or so of the radar system. This can, in turn, result in poor radar system performance in parking or low-speed vehicle operations.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 2A is a graph depicting a typical range profile of a reflected radar signal captured by an automotive radar system.

DETAILED DESCRIPTION

Figure 1:
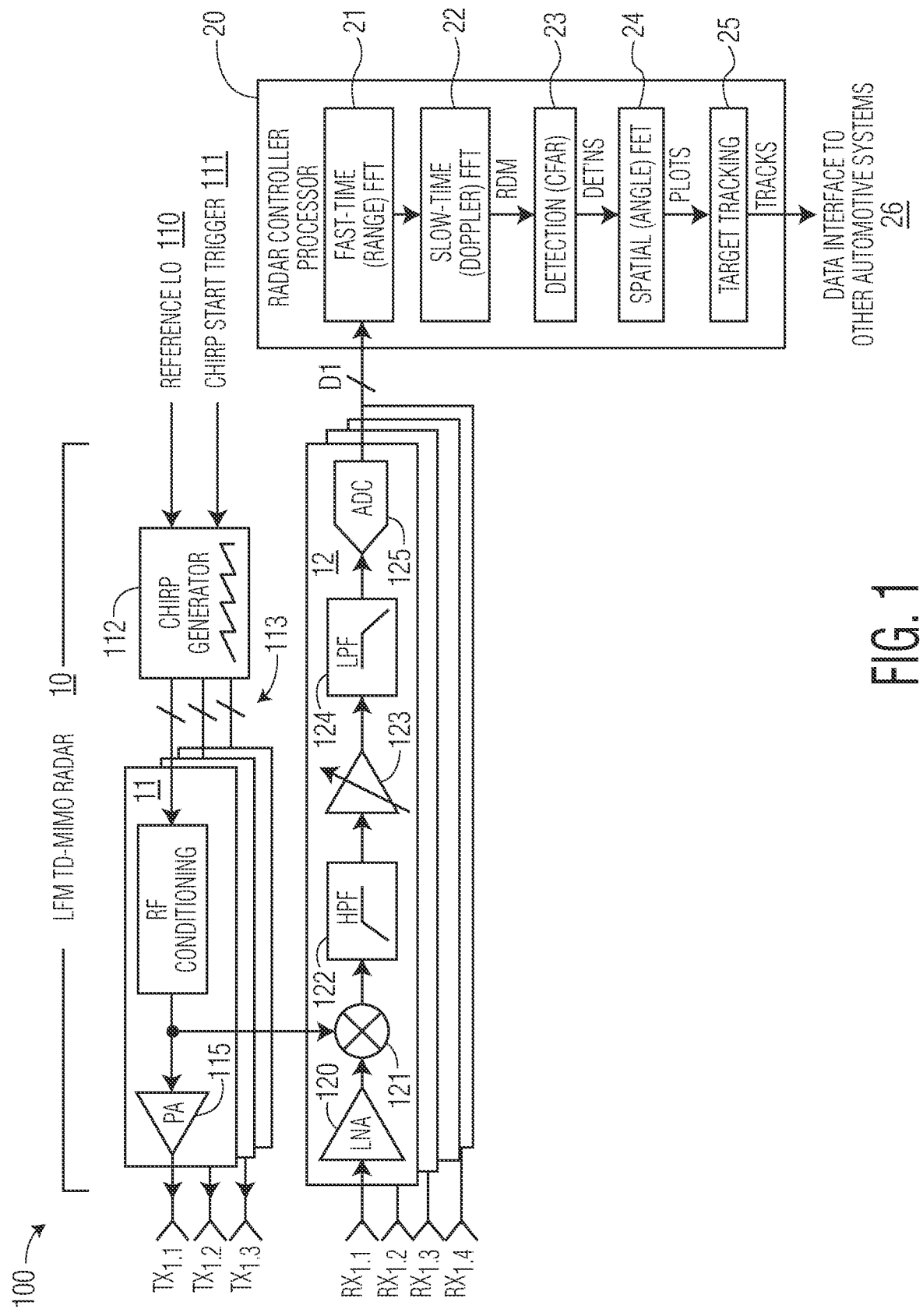
FIG. 1 is a simplified schematic block diagram of a conventional LFM TD-MIMO automotive radar system.

The following detailed description is merely illustrative in nature and is not intended to limit the embodiments of the subject matter of the application and uses of such embodiments. As used herein, the words "exemplary" and "example" mean "serving as an example, instance, or illustration." Any implementation or embodiment described herein as exemplary, or an example is not necessarily to be construed as preferred or advantageous over other implementations. Furthermore, there is no intention to be bound by any expressed or implied theory presented in the preceding technical field, background, or the following detailed description.

In some automotive radar applications, near-range estimation performance (i.e., the accurate detection and ranging of objects within a meter or so of the radar system) is diminished due to monolithic microwave integrated circuit (MMIC) and antenna coupling and reflection from the vehicle's bumper that houses the radar system (in automotive radars). In this disclosure the bumper housing the radar system (or at least a transmitting antenna and/or receiving antenna of the system) is referred to as the transmitting-vehicle bumper. References in this disclosure to a "bumper" refer to the transmitting-vehicle bumper and do not refer to bumpers of other vehicles.

The present disclosure provides an automotive radar system methodology that mitigates the interference caused by radar system component spill-over and transmitting-vehicle bumper reflection. These undesired multipath signals can present as a series of strong target signatures in close proximity to the transmitting-vehicle bumper that appear as strong signals at the very beginning of the range-profile. Those signals, which are false reflection signals can, in turn, mask the detection of true targets (e.g., other vehicles and solid objects) that are in proximity to the vehicle's radar system. Specifically, because the point-spread-function (PSF) of a radar system may not be a single delta-Dirac, and instead presents side-lobes which are proportional to the signal strength, the false signals generated by spill-over and transmitting-vehicle bumper reflection may mask and interfere with the detection of other, weaker targets in the vicinity of the vehicle.

The present disclosure, therefore, provides an improved automobile radar system that applies an adaptive filter to remove those unwanted signals. In an embodiment, the adaptive filter uses range-compressed signals as an input to a recursive least squares (RLS) adaptive algorithm as part of the radar system's channel estimation routine. Given the precise knowledge of the PSF of the radar system, as described herein, the adaptive filter approach converges efficiently and accurately in determining the radio frequency (RF) channel transfer function without using a priori information. Then, the first few samples of the estimated discrete RF channel represent the undesired multi-path signals generated by spill-over and transmitting-vehicle bumper reflections. The estimated RF channel data, once determined, can then be used to eliminate the entire PSF contribution of the near-range unwanted multipath signals, including sidelobes, without affecting the signatures of the other targets. In this manner, the present system enables signals generated by spill-over and transmitting-vehicle bumper reflections to be removed from the radar system's detected or received signal enabling, in turn, more accurate detection and tracking of targets that are in relative proximity to the automotive radar system.

In the context of the present disclosure, it will be appreciated that radar systems may be used as sensors in a variety of different applications, including but not limited to automotive radar sensors for road safety and vehicle control systems, such as advanced driver-assistance systems (ADAS) and autonomous driving (AD) systems.

In such applications, the radar systems are used to measure the radial distance to a reflecting object, its relative radial velocity, and angle information, and are characterized by performance criteria, such as the angular resolution (the minimum distance between two equal large targets at the same range and range rate (or radial velocity) resolution cell which a radar is able to distinguish and separate to each other), sensitivity, false detection rate, and the like.

Typically, frequency modulated continuous wave (FMCW) modulation radars are used to identify the distance, velocity, and/or angle of a radar target, such as a car or pedestrian, by transmitting Linear Frequency Modulation (LFM) waveforms from transmit antennas so that reflected signals from the radar target are received at receive antennas and processed to determine the radial distance, relative radial velocity, and angle (or direction) for the radar target.

To illustrate the design and operation of a conventional TD MIMO radar system, reference is now made to FIG. 1 which depicts a simplified schematic block diagram of a conventional LFM TD-MIMO automotive radar system 100 which includes an LFM TD-MIMO radar device 10 connected to a radar controller processor 20. In selected embodiments, the LFM TD-MIMO radar device 10 may be embodied as a line-replaceable unit (LRU) or modular component that is designed to be replaced quickly at an operating location. Similarly, the radar controller processor 20 may be embodied as a line-replaceable unit (LRU) or modular component. Although a single or mono-static LFM TD-MIMO radar device 10 is shown, it will be appreciated that additional distributed radar devices may be used to form a distributed or multi-static radar. In addition, the depicted radar system 100 may be implemented in integrated circuit form with the LFM TD-MIMO radar device 10 and the radar controller processor 20 formed with separate integrated circuits (chips) or with a single chip, depending on the application.

Each radar device 10 includes one or more transmitting antenna elements TXi and receiving antenna elements RXj connected, respectively, to one or more radio frequency (RF) transmitter (TX) units 11 and receiver (RX) units 12. For example, each radar device (e.g., 10) is shown as including individual antenna elements (e.g., TX1,i, RX1,j) connected, respectively, to three transmitter modules (e.g., 11) and four receiver modules (e.g., 12), but these numbers are not limiting and other numbers are also possible, such as four transmitter modules 11 and six receiver modules 12, or a single transmitter module 11 and/or a single receiver modules 12.

Each radar device 10 also includes a chirp generator 112 that is configured and connected to supply a chirp input signal to the transmitter modules 11. To this end, the chirp generator 112 is connected to receive a separate and independent local oscillator (LO) signal 110 and a chirp start trigger signal 111, though delays are likely to be different due to the signal path differences and programmable digital delay elements in the signal paths. Chirp signals 113 are generated and transmitted to multiple transmitters 11, usually following a pre-defined transmission schedule, where they are filtered at the RF conditioning module 114 and amplified at the power amplifier 115 before being fed to the corresponding transmit antenna TX1,i and radiated. By sequentially using each transmit antenna TX1,i to transmit successive pulses in the chirp signal 113, each transmitter element 11 operates in a time-multiplexed fashion in relation to other transmitter elements because they are programmed to transmit identical waveforms on a temporally separated schedule.

The radar signal transmitted by the transmitter antenna unit TX1,i, TX2,i may by reflected by an object, and part of the reflected radar signal reaches the receiver antenna units RX1,i at the radar device 10. At each receiver module 12, the received (radio frequency) antenna signal is amplified by a low noise amplifier (LNA) 120 and then fed to a mixer 121 where it is mixed with the transmitted chirp signal generated by the RF conditioning module 114. The resulting intermediate frequency signal is fed to a first high-pass filter (HPF) 122. The resulting filtered signal is fed to a first variable gain amplifier 123 which amplifies the signal before feeding it to a first low pass filter (LPF) 124. This re-filtered signal is fed to an analog/digital converter (ADC) 125 and is output by each receiver module 12 as a digital signal D1. The receiver module compresses target echo of various delays into multiple sinusoidal tones whose frequencies correspond to the round-trip delay of the echo.

The radar system 100 also includes a radar controller processing unit 20 that is connected to supply input control signals to the radar device 10 and to receive therefrom digital output signals generated by the receiver modules 12.

In selected embodiments, the radar controller processing unit 20 may be embodied as a micro-controller unit (MCU) or other processing unit that is configured and arranged for signal processing tasks such as, but not limited to, target identification, computation of target distance, target velocity, and target direction, and generating control signals. The radar controller processing unit 20 may, for example, be configured to generate calibration signals, receive data signals, receive sensor signals, generate frequency spectrum shaping signals (such as ramp generation in the case of FMCW radar) and/or register programming or state machine signals for RF (radio frequency) circuit enablement sequences.

In addition, the radar controller processor 20 may be configured to program the modules 11 to operate in a time-division fashion by sequentially transmitting LFM chirps for coordinated communication between the transmit antennas TX1,i, RX1,j. The result of the digital processing at the radar controller processing unit 20 is that the digital domain signals D1 are processed for the subsequent fast-time range frequency Fourier transform (FFT) 21, slow-time FFT 22 for Doppler compression, constant false alarm rate (CFAR) target detection 23, spatial angle estimation 24, and target tracking processes 25, with the result being output 26 to other automotive computing or user interfacing devices for further process or display. When performing target detection, the radar controller processor 20 is configured to determine a range profile of the reflected radar signals, where peaks in the range profile are indicative of potential targets at known ranges.

FIG. 2A is a graph 200 depicting a typical range profile of a reflected radar signal captured by an automotive radar system. In graph 200, the horizontal axis represents distances from the radar system's transmit and receive antennas measured in meters (m). The vertical axis represents the magnitude of the range profile signal level measured in decibels (dB) at a given distance. In FIG. 2A, line 202 represents that the range profile signal as it would be generated by a conventional automotive radar system implementing conventional signals processing approaches. As illustrated, at shorter distances (e.g., ranging from 0 m to about 0.25 m), the range profile depicted by line 202 has a large peak 204. Peak 204 is generated by the portion of the received radar signal that was reflected from the transmitting-vehicle's bumper and generated by component coupling. Those reflections are indicated by dots 205. The magnitude of peak 204 may be relatively large (e.g., in the range of 40 dB-60 dB) compared to the peaks generated by detected objects.

Within FIG. 2A, for example, a number of objects were present in the vicinity of the radar system as indicated by dots 206a-206d. As shown, the large peak 204 in line 202 created by transmitting-vehicle bumper reflection and component coupling obscures the peak in the range profile signal created by the object represented by dot 206a. If, for example, the object associated with dot 206a is a low radar cross-section (RCS) object, the peak in the range profile for that object may only have a magnitude in the range of 15 dB-20 dB, which would be significantly obscured by the large peak 204. Consequently, a radar system controller may fail to detect the object at a range of about 0.25 m due to that inference.

Additionally, because the transmitting-vehicle bumper reflection and component coupling present side-lobes which are proportional to the signal strength, these interference signals may mask and prevent detection of other, weaker objects in the vicinity of the vehicle. Within FIG. 2A, for example, a number of objects were present in the vicinity of the radar system as indicated by dots 206a-206d. However, the peaks in the range profile associated with those objects are each less prominent because the interference resulted from transmitting-vehicle bumper reflection and component coupling causes the minimum value of the range profile of line 202 to be artificially increased. Consequently, the magnitude of the difference between the peaks in line 202 associated with the objects represented by dots 206a-206d and the baseline portions of line 202 that are not associated with detected objects is reduced, which, in turn, makes it more difficult for the radar system control to properly detected the objects represented by dots 206a-206d. In essence, the interference caused by transmitting-vehicle bumper reflections and component coupling decreases the signal-to-noise ratio of the entire range profile illustrated by line 202.

The present disclosure provides a radar system configured to remove or filter the peak 204 in the range profile signal generated by an automotive radar system that results from unwanted transmitting-vehicle bumper reflection and component coupling interference. After processing, the radar system is configured to generate a corrected range profile signal that is depicted as line 208 in FIG. 2A. As illustrated, in the corrected range profile, the large peak 204 that resulted from unwanted signal interference has been removed. As a result, the object represented by dot 206a is no longer obscured by the large unwanted peak and is readily detectable as a substantial peak in the range profile at the distance of about 0.25 m.

Furthermore, because the unwanted multi-path interference signals have been removed from the range profile signal, the difference in signal level between the minimal signal level of the corrected range profile and the peaks in the corrected range profile resulting from the objects indicated by dots 206a-206d is increased, thereby improving the signal-to-noise ratio of the corrected range profile making the detection of those peaks easier and more accurate. This results because the side-lobe interference that would have been generated by the bumper reflection and component coupling has been removed.

The example range profiles depicted in the example of FIG. 2A may be generated using a Taylor windowing function. The present system for noise reduction in a received range profile signal may be utilized in conjunction with vehicle radar signal processing systems that use other types of windowing functions.

Figure 2B:
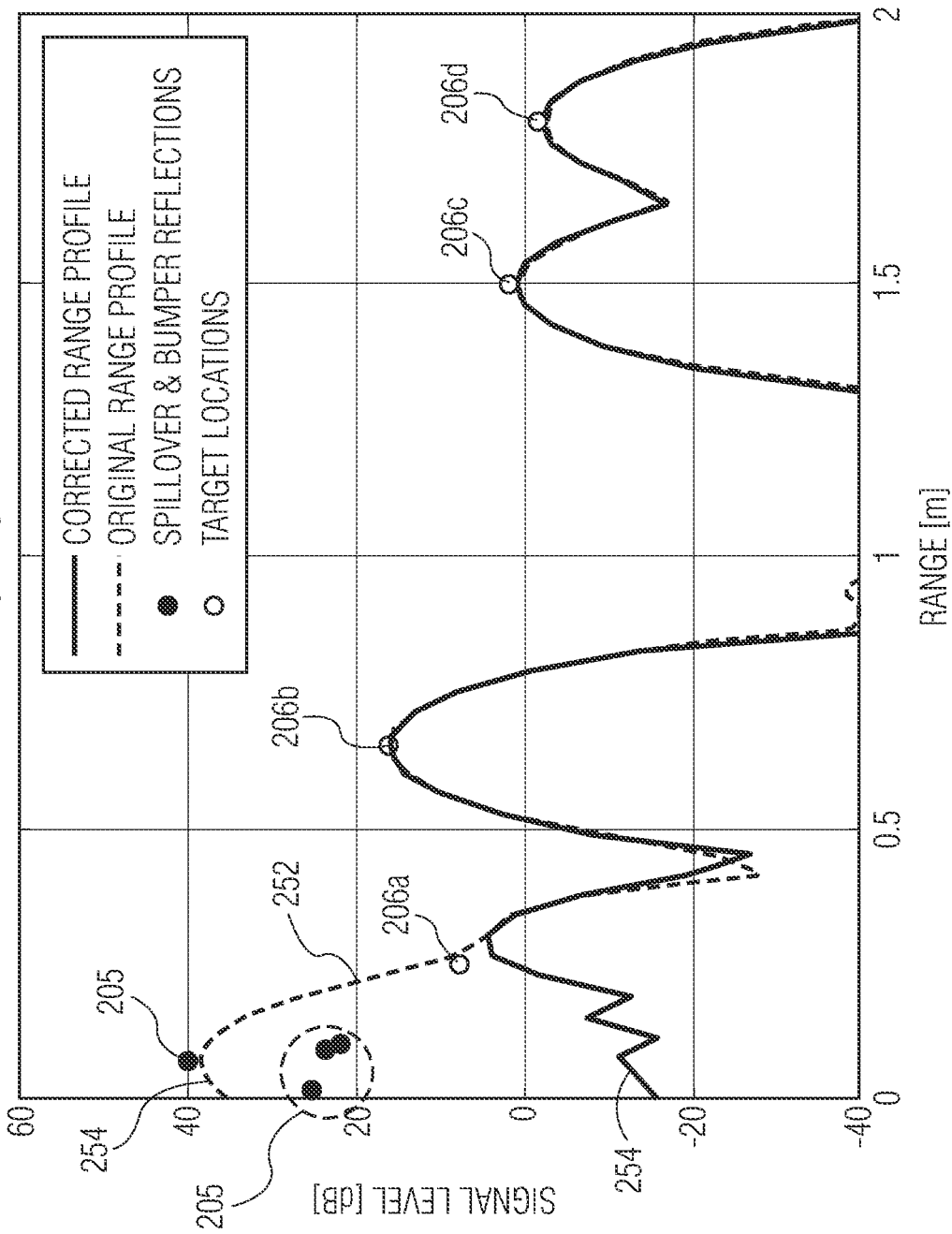
FIG. 2B is a graph depicting a range profile of a reflected radar signal captured by an automotive radar system and processed using a Blackman tapering window function.

For example, FIG. 2B is a graph 250 depicting a range profile of a reflected radar signal captured by an automotive radar system and processed using a Blackman windowing function. In graph 200, the same objects are present in the captured scene, as indicated by dots 206a-206d. Furthermore, the same transmitting-vehicle bumper and component coupling interference is present, as indicated by dots 205. In FIG. 2B, the horizontal axis represents distance, while the vertical axis represents the magnitude of the range profile at a given distance.

In FIG. 2B, line 252 represents that the range profile signal as it would be generated by a conventional automotive radar system implementing conventional signals processing approaches. As illustrated, at shorter distances (e.g., ranging from 0 m to about 0.25 m), the range profile depicted by line 202 has a large peak 254. Peak 254 is generated by the portion of the received radar signal that was reflected from the vehicle's bumper and generated by component coupling. Those reflections are indicated by dots 205. Peak 254 in line 252 created by transmitting-vehicle bumper reflection and component coupling obscures the peak in the range profile signal created by the object represented by dot 206a. If, for example, the object associated with dot 206a is a low radar cross-section (RCS) object, the peak in the range profile for that object may only have a relatively low magnitude, which would be significantly obscured by the large peak 254.

When the received radar signal is processed and filtered in accordance with the present disclosure, peak 254 is removed from the range profile thereby mitigating the effects of transmitting-vehicle bumper reflection and component coupling interference. The corrected range profile signal is depicted as line 208 in FIG. 2A. As illustrated, in the corrected range profile, the large peak 254 that resulted from unwanted signal interference has been removed. As a result, the object represented by dot 206a is no longer obscured by the large unwanted peak and is readily detectable as substantial peak in the range profile at the distance of about 0.25 m.

The present disclosure provides an automotive radar system configured to remove unwanted signal interference resulting from bumper reflections and component coupling. As described above with respect to FIGS. 2A and 2B, this interference can result in poor near-range estimation performance in various types of radar systems, including low to medium cost direct-conversion FMCW. By improving the near-range performance of automotive radar systems, fine-near-range estimation applications for such radar systems, such as parking or corner sensing, can be provided to vehicle operators.

Figure 3:
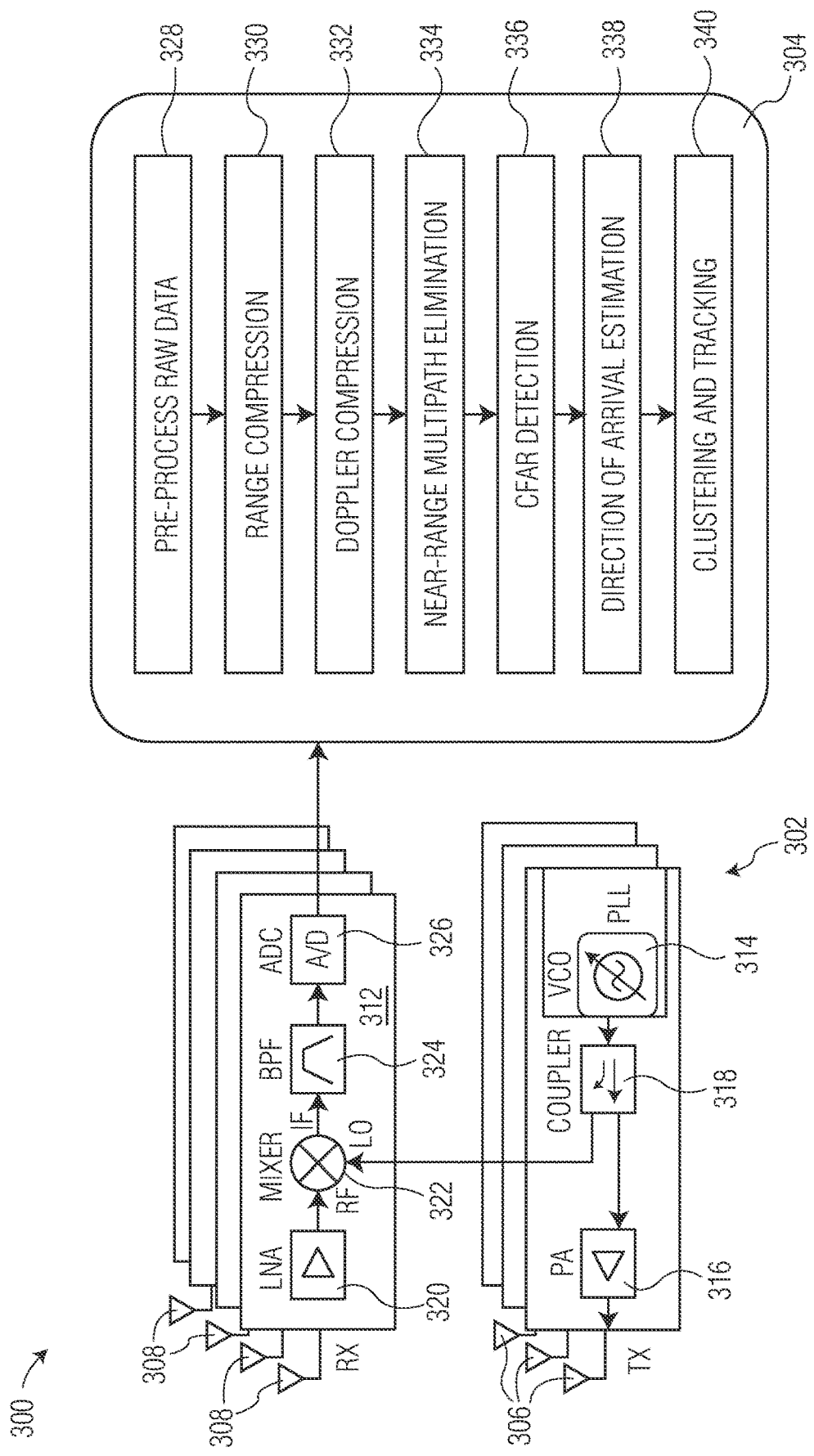
FIG. 3 depicts a simplified schematic block diagram of an automotive radar system that includes an LFM TD-MIMO radar device connected to a radar controller processor and configured in accordance with the present disclosure.

FIG. 3 depicts a simplified schematic block diagram of an automotive radar system 300 which includes an LFM TD-MIMO radar device 302 connected to a radar controller processor 304. Although a single or mono-static automotive radar system 300 is shown, it will be appreciated that additional distributed radar devices may be used to form a distributed or multi-static radar. In addition, the depicted automotive radar system 300 may be implemented in integrated circuit form with the LFM TD-MIMO radar device 302 and the radar controller processor 304 formed with separate integrated circuits (chips) or with a single chip, depending on the application.

Each radar device 302 includes one or more transmitting antenna elements 306 and receiving antenna elements 308 connected, respectively, to one or more RF transmitter modules 310 and receiver modules 312. For example, each radar device (e.g., 302) is shown as including individual antenna elements 306, 308 connected, respectively, to three RF transmitter modules 310 and four receiver modules 312, but these numbers are not limiting and other numbers are also possible.

Each RF transmitter module 310 include a phase-locked loop oscillator 314 configured to process and filter chirp signals and output the filtered signals according to a determined schedule to power amplifier 316 through RF coupler 318. Each power amplifier 316 is configured to amplify the signal received from RF coupler 318 and transmit the amplified signal through one of antenna elements 306.

The radar signals transmitted by transmitter antenna elements 306 may by reflected by objects, and part of the reflected radar signal reaches the receiver antenna elements 308 at radar device 302. At each receiver module 312, the received (radio frequency) antenna signal is amplified by LNA 320 and then fed to mixer 322 where the received signal is mixed with the transmitted filtered chirp signal generated by phase-locked loop oscillator 314 and received from RF coupler 318. The resulting intermediate frequency signal is fed to band-pass filter 324 that is configured to remove portions of the intermediate frequency signal that have frequencies falling outside the describe frequency range of the received signal. The filtered signal is then converted into a digital signal by analog-to-digital converter 326. The digitized version of the intermediate frequency signal is then passed to radar controller processor 304 for processing in the digital domain to generate a corresponding range profile for the received signal.

Radar controller processor 304 may be implemented as a micro-controller unit (MCU) or other processing unit that is configured and arranged for signal processing tasks such as, but not limited to, target identification, computation of target distance, target velocity, and target direction, and generating control signals. Radar controller processor 304 may, for example, be configured to generate calibration signals, receive data signals, receive sensor signals, generate frequency spectrum shaping signals (such as ramp generation in the case of FMCW radar) and/or register programming or state machine signals for RF (radio frequency) circuit enablement sequences.

In the depicted signal processing sequence, radar controller processor 304 is configured to execute pre-processing 328 of the raw digital data received from receiver modules 312. This may involve processing the signal to remove noise or errors in the data, or to convert the received digital signal into a format more suited to remaining processing block of the signal processing sequence.

Once the digital signal has been pre-processed, radar controller processor 304 executes a range compression function 330 on the processed signal (e.g., via a fast-time FFT). Following range compression, radar controller processor 304 executes a doppler compression function 332 on the signal (e.g., via a slow-time FFT) received from range compression function 330. Doppler compression function 332 concentrates signal energy in both the range dimension and the doppler dimension to provide an improved signal-to-noise ratio in the filtered signal output of doppler compression function 332.

After doppler compression, radar controller processor 304 executes a near-range multipath elimination function 334 on the processed signal to remove the effects of near-range interference (e.g., generated by bumper reflections and component coupling) from the processed signal. The operation of near-range multipath elimination function 334 is discussed in more detail, below. The output of near-range multipath elimination function 334 is a range profile (e.g., such as those depicted in FIGS. 2A and 2B) that may be analyzed to detected target and provide appropriate driver alerts, if necessary.

As such, after the near-range interference effects have been removed from the signal by near-range multipath elimination function 334, radar controller processor 304 executes CFAR detection block 336 to detect potential targets in the range profile received from near-range multipath elimination function 334, direction of arrival estimation block 338, and target clustering and tracking block 340 to track targets identified by CFAR detection block 336 over time. The detected, clustered, and tracked target data can then be output to other automotive computing or user interfacing devices for further process or display.

Although FIG. 3 depicts near-range multipath elimination function 334 as being executed immediately following doppler compression function 332, it should be understood that near-range multipath elimination function 334 could be executed after any of the signal processing functional blocks depicted in radar controller processor 304 of FIG. 3. For example, near-range multipath elimination function 334 may instead be executed immediately following range compression function 330. In that case, because less processing has been performed on the radar signal prior to execution of near-range multipath elimination function 334, the signal processed by near-range multipath elimination function 334 may have a reduced signal-to-noise range, potential resulting in less effective performance of near-range multipath elimination function 334, but such a configuration would still achieve benefits over conventional system.

Figure 4:
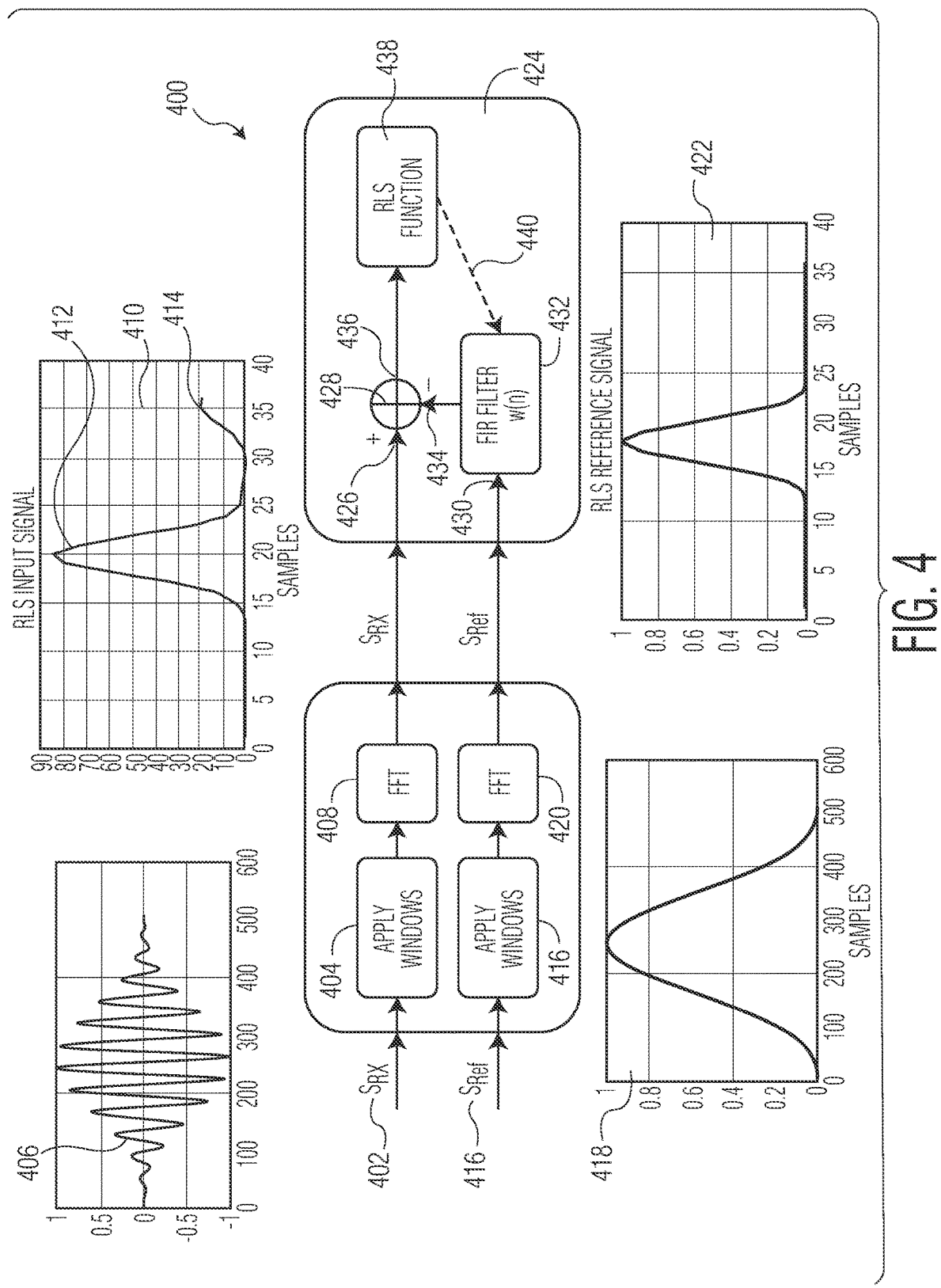
FIG. 4 is a block diagram depicting a signal processing path for determining coefficients of a filter configured to remove near-range interference effects from a signal received by an automotive radar system.

FIG. 4 is a block diagram depicting a signal processing path 400 for filtering near-range interference effects from a signal received by an automotive radar system. In a specific embodiment, processing path 400 is utilized to implement the functionality of near-range multipath elimination function 334 of FIG. 3. The signal processing path 400 of FIG. 4 may be executed, for example, by radar controller processor 304 of FIG. 3 or any other suitably configured signal processing component.

Signal processing path 400 includes a first input 402 configured to receive an input signal $s_{RX}$ (e.g., a range-compressed input signal received from doppler compression function 332 of FIG. 3), where $s_{RX}$ is in the time domain. Typically, as an input signal to signal processing path 400, the signal $s_{RX}$ is a one-dimensional signal (e.g., the zero-velocity column of the output of doppler compression function 332), though in other embodiments, multi-dimensional input signals may be utilized in which the signal processing path 400 is iteratively executed on each column of the multi-dimensional input signals.

The input signal $s_{RX}$ generally comprises a number of different received RF waves that are summed together, where each wave of the plurality of summed waves is associated with an RF signal reflected from a target in the field of vision of the radar system. For objects that are closer to the radar system transmitters and receivers, the reflected wave will have a lower frequency, while the wave reflected from more distant objects will have a higher frequency.

The input signal $s_{RX}$ is processed through a tapering window 404 (e.g., a Taylor or Blackman tailoring window) to generate a digital and tapered input signal (e.g., waveform 406). A FFT 408 is applied to the tapered input signal to generate a range profile $S_{RX}$ (see waveform 410) comprising a number of data points. At this point in processing, the range profile is complex, so the zero point (e.g., the portion of the range profile at a distance of 0 meters) is positioned in the center of waveform 410 (e.g., at about the 20$^{th}$ sample, which is depicted on the horizontal axis), with complex components extending to the left in the depicted waveform 410. As such the range profile is 'wrapped,' such that values in the range profile that are to the left of the zero may represent distant targets, but their respective magnitude values have been wrapped to negative distances. The horizontal axis of the range profile depicted by waveform 410 represents distance, while the vertical axis represents the magnitude of the reflected radar signal at that distance. Accordingly, peaks in the range profile $S_{RX}$ are likely caused by objects that have reflected the radar signal and represent likely targets for the automotive radar system. At this point in the signal processing process the range profile $S_{RX}$ shown by waveform 410 includes a large peak 412 at about the zero distance, which represents the interference caused by the transmitting-vehicle bumper reflections and component coupling. A more distant peak 414 may represent a more distant target in the range profile.

At a second input 415, a reference signal SRef is received. The reference signal includes a series of '1' values having the same length as the received input signal SRX. The reference signal SRef is processed through a tapering window 416 that applies the same tapering window as that applied by window 404 to generate a digitized tapered reference signal (e.g., waveform 418). A FFT 420 is applied to the tapered input signal to generate a range profile $S_{REF}$, which now represents a point spread function placed at the original (i.e., the location of the transmitting-vehicle bumper) and is illustrated by waveform 422. In various radar systems, although FFTs may be used process an input reference signal, in other systems, such as pulsed radar system, may use matched filters in place of FFT 420.

Figure 6:
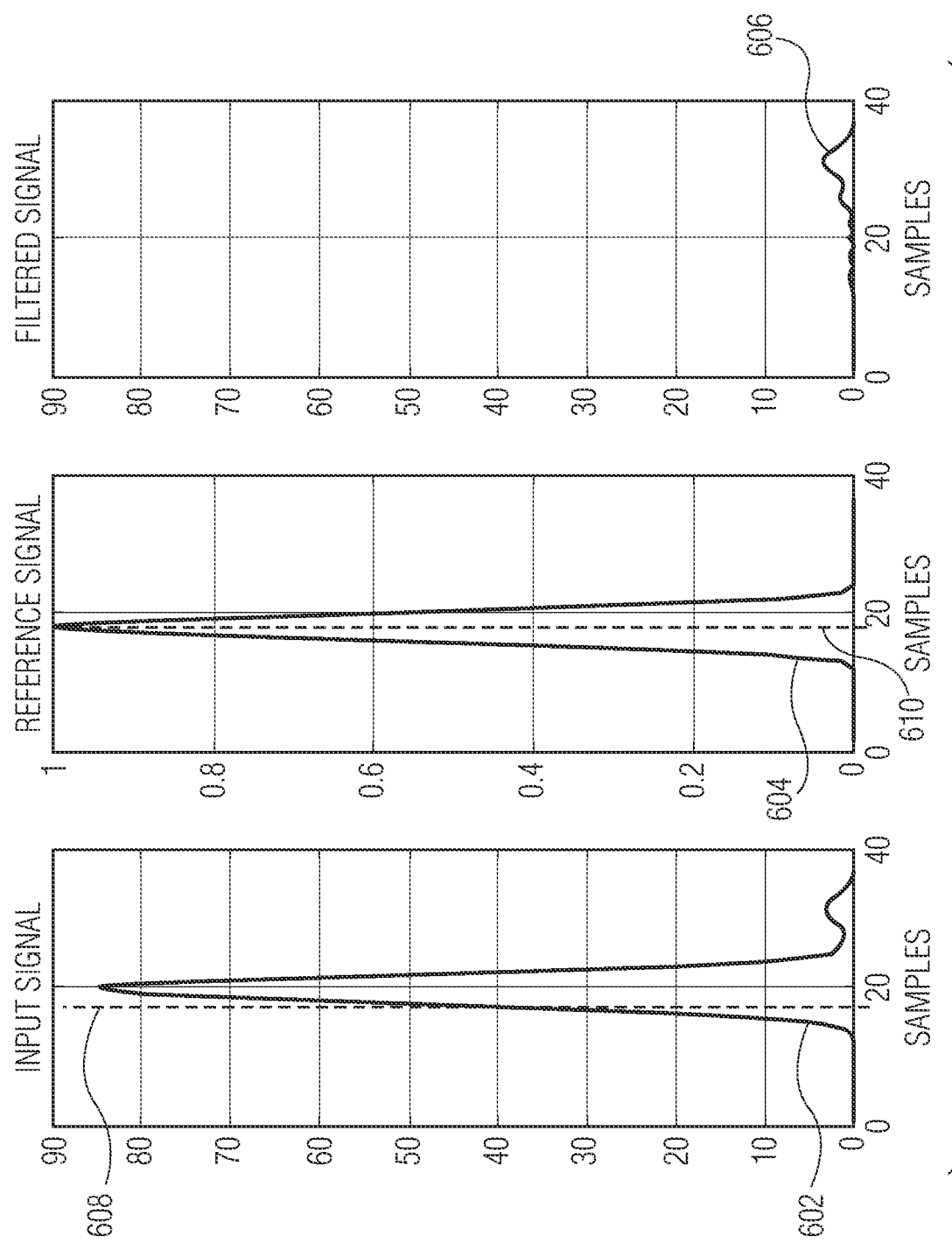
FIG. 6 depicts three charts showing example waveforms for an input signal $S_{RX}$, a reference signal $S_{Ref}$, and a processed signal $\hat{S}_{RX}$.

Accordingly, the output of FFT 420 is, essentially, the range profile for the transmitting-vehicle bumper reflections and component coupling interference occurring at 0 m. This range profile is also complex with the zero point (e.g., the portion of the range profile at a distance of 0 m) being positioned in the center of waveform 422 (e.g., at about the 20$^{th}$ sample, which is depicted on the horizontal axis), with complex components extending to the left in the depicted waveform 422. The input signal range profile $S_{RX}$ and the reference signal $S_{Ref}$ that are output, respectively, by FFT 408 and FFT 420 may be aligned such as the peak (or center) of the reference signal $S_{Ref}$ is aligned with the 0 Range bin of the received input signal range profile, as shown in FIG. 6 and described below.

Because the reference signal $s_{Ref}$ is a predefined signal (i.e., a sequence of 1's of known length) and the tapering window has a predetermined configuration, the range profile of the reference signal $S_{Ref}$ (i.e., the data making waveform 422) may be precalculated and stored in a memory system of a system controller (e.g., radar controller processor 304 of FIG. 3) so that the reference range profile does not need to be continuously recalculated and may instead be retrieved from that memory when the range profile is needed.

Within the signal processing flow of FIG. 4, the input signal range profile $S_{RX}$ illustrated by waveform 410 and the reference signal range profile $S_{Ref}$ illustrated by waveform 422 are provided as inputs to recursive least squares (RLS) processing block 424. Specifically, the set of N data point in the input signal range profile $S_{RX}$ representing distances in proximity to the automotive radar system (e.g., range profile data points ranging from 0 m to 1 m) are supplied at the positive input 426 of summation block 428. Similarly, the N data points in the reference signal range profile $S_{Ref}$ that would represent distances in proximity to the automotive radar system (e.g., range profile data points ranging from 0 m to 1 m) are supplied at the input 430 of finite impulse response (FIR) filter 432. FIR filter 432 is configured with n taps or filter coefficients, where the number of taps or filter coefficients n in FIR filter 432 can be determined based upon by the expression $$N = \frac{R_e}{\delta r}$$

where N is the number of coefficients, $R_e$ is the range of interest (e.g., the region of the range profile over which near-range interference is expected, and δr is a range cell which is a sampled portion of the input signal range profile $S_{RX}$. In other embodiments, the number of coefficients n in FIR filter 432 may be equal to a number n that is less than 4 times N (i.e., 4×N).

The portion of the reference signal range profile $S_{Ref}$ received by the FIR filter 432 at input 430 is filtered by FIR filter 432 and the filtered signal is supplied at the negative input 434 of summation block 428 and is therefore subtracted from the portion of the input signal range profile $S_{RX}$ received by summation block 428 at positive input 426. Summation block 428 therefore outputs at its output terminal 436 an output signal that is the difference (i.e., an error) between the portion of the input signal range profile SRX received at positive input 426 and the filtered portion of the reference signal range profile $S_{Ref}$ received at negative input 434.

The error output of summation block 428 is supplied to RLS function block 438, which is configured to adjust the filter coefficients of FIR filter 432 in an attempt to minimize the error signal that is received from summation block 428. In general, RLS function block 438 is configured to implement a recursive algorithm configured to determine a set values w(n) for the coefficients of FIR filter 432 that will minimize the magnitude of the error signal output by summation block 428 and its output terminal 436. RLS function block 438 is configured to adjust the coefficient values of FIR filter 432 via a control signal 440.

The loop established by summation block 428, summation block 428, and RLS function block 438 executes recursively until the coefficient values w(n) of FIR filter 432 are identified that minimize the error signal output by summation block 428. At this time, the coefficient values have converged, and the recursive algorithm implemented by RLS function block 438 is complete.

In various embodiments, the RLS algorithm implemented by 438 may be implemented as follows. With inputs X (i.e., the input signal range profile), D i.e., the reference signal range profile), $\lambda$ and $\varepsilon$. $\lambda$ and $\varepsilon$ represent the forgetting factor and the covariance initialization. For channel estimation configuration $\lambda$ is typically between 0.9 and 1 and $\varepsilon$ can be empirically fine-tuned. If data is normalized, then $\varepsilon$ may take values close to 1.

Based upon the input values, the iterative loop executed by RLS function block 438 is of the form shown in Table 1, below.

TABLE 1 for n = 1, . . . do
    $x(n) = X_{n:n+N}$
    $d(n) = D_n$
    $z(n) = x^H(n)P(n-1)$ $$k(n) = \frac{z^H(n)}{\lambda + z(n)x(n)}$$

$\alpha(n) = d(n) - w^H(n-1)x(n)$
    $w(n) = w(n-1) + k(n)\alpha^*(n)$ $$P(n) = \frac{1}{\lambda}(P(n-1) - k(n)z(n))$$

end for

The complexity of the RLS algorithm shown in Table 1 implemented by RLS function block 438 per iteration is given by $O(N^2)$ additions and $O(N^2)$ multiplications, where N is the total number of filter taps. The number of iterations depends on the total number of available samples provided by the signals X and D. The signals x(n) and d(n) are constructed using a sliding window of size N from the signals X and D, where N is the order of the filter, $w^H$.

In some conventional uses of RLS filters, such as speech and audio processing applications, N takes large values and the size of X can reach over 1000 samples. Because of this, the RLS algorithm is rarely used, and is instead replaced by the normalized least mean squares (NLMS) or least mean squares (LMS) algorithms that have a much slower convergence, but O(N) complexity per iteration. In contrast to those application, in the present invention RLS function block 438 requires a small order for the FIR filter, generally no more than N=3 coefficients. Consequently, the total complexity per iteration is $5N^2+6N$, and the recommended number of iterations is 3N. This results in a total complexity of $3N(5N^2+6\,N)=567$ arithmetic operations for the RLS algorithm implemented by RLS function block 438.

With the RLS algorithm implemented by RLS function block 438 converged, the coefficient values w(n) of FIR filter 432 encode information from the scene captured by the radar system input signal and can be used to convert the predetermined $S_{Ref}$ signal (e.g., waveform 422) into a waveform representing how the $S_{Ref}$ signal would appear in the range profile for the scene described by the input signal range profile. Because the $S_{Ref}$ signal represents the interference generated by transmitting-vehicle bumper reflection and component coupling, this allow the interference generated by such bumper reflection and component coupling to be removed from the input signal range profile $S_{RX}$. In typical implementations, the RLS algorithm implemented by RLS function block 438 will converge relatively quickly. In simulations, the algorithm will usually converge after around 25 or 30 iterations. As such, the RLS algorithm is efficient and may require less computational headroom than other signal processing techniques.

In various embodiments, the efficiency of RLS function block 438 can be further improved by truncating the length of the input signal $S_{RX}$ and reference signal $S_{Ref}$. Because the interference caused by transmitting-vehicle bumper reflections and component coupling primarily result in interference in closed proximity to the radar system, the length of the input signal $S_{RX}$ and reference signal $S_{Ref}$ may be truncated so that the signals only include range profile data for distances ranging from 0 m to the edge of the bumper (e.g., around 0.15 m to 0.20 m), although in other embodiments, different amounts of truncation may be utilized to account for differently sized bumpers or other system implementation considerations.

With the weights w(n) of FIR filter 432 determined, it is possible to remove the effects of the transmitting-vehicle bumper reflection and component coupling from the input signal.

Figure 5:
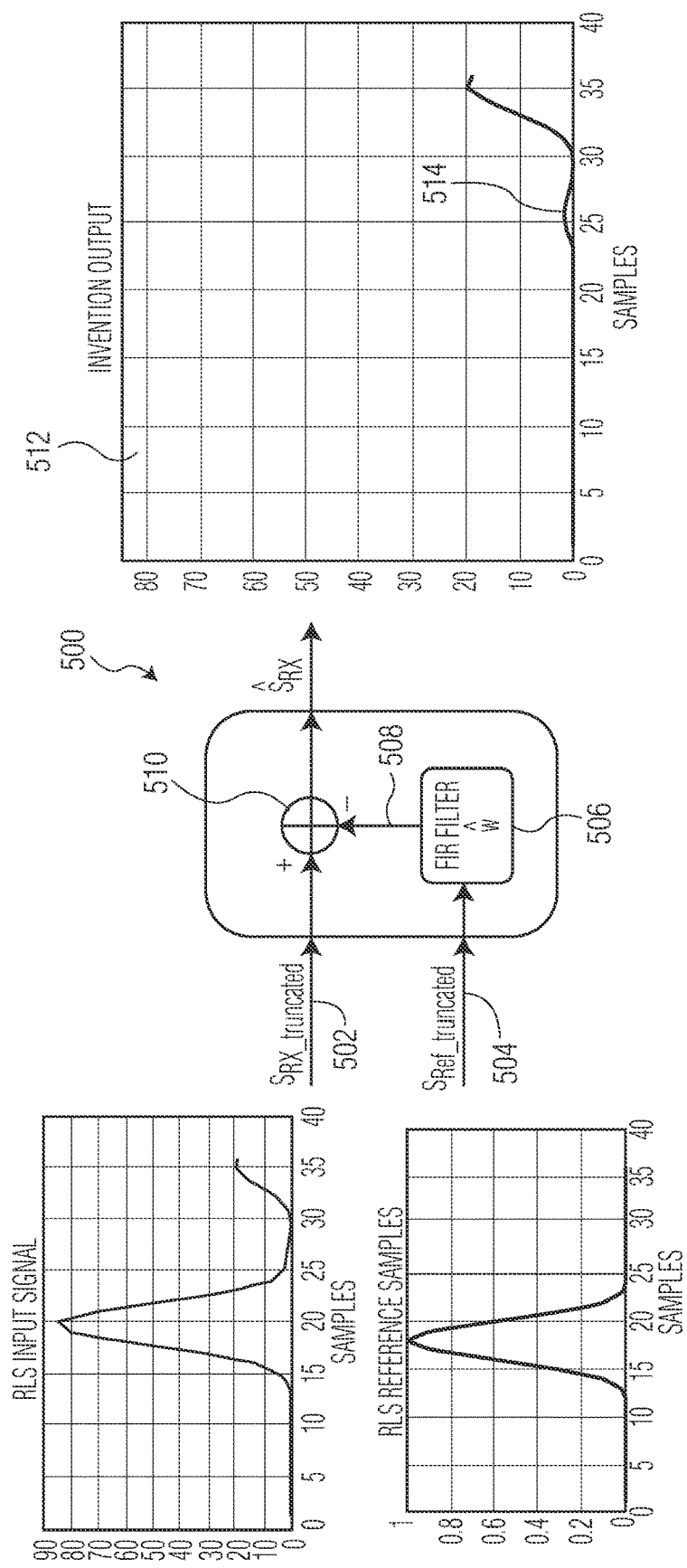
FIG. 5 is a block diagram depicting a data processing process flow for removing near-range interference resulting from transmitting-vehicle bumper reflections and component coupling in a received range profile.

FIG. 5 is a block diagram depicting the data processing flow 500 for removing near-range interference resulting from transmitting-vehicle bumper reflections and component coupling in a received range profile. The data processing flow 500 depicted by FIG. 5 may be executed by radar controller processor 304 of automotive radar system 300 of FIG. 3.

Data processing flow 500 includes a first input 502 configured to receive a signal $S_{RX\_truncated}$. The signal $S_{RX\_truncated}$ includes the portion of the range profile signal that is output by FFT 408 of signal processing path 400 of FIG. 4 (i.e., $S_{RX}$) that covers the desired range of potential interference. Because transmitting-vehicle bumper interference and component coupling creates interference in close proximity to the vehicle, the signal $S_{RX\_truncated}$ may comprises the first few centimeters or tens of centimeters of the range profile signal output by FFT 408 (e.g., the portion of the range profile from 0 m to about 0.25 m).

Data processing flow 500 includes a second input 504 configured to receive a second signal $S_{Ref\_truncated}$ that includes the same portion or distance range of the reference signal range profile $S_{Ref}$ that is output by FFT 420 of signal processing path 400 of FIG. 3.

Given a desired range, the number of data points in both the input signal received at first input 502 and the reference signal received at second input 504 may be determined using the expression $$N = \frac{R_e}{\delta r}$$

where N is the number of data points, $R_e$ is the elimination range (e.g., the distance over which the interference is expected to occur, such as a range from 0 m to 0.25 m), and $\delta r$ is the range cell.

The truncated portion of the reference signal range profile received at second input 504 is supplied as an input to FIR filter 506, which includes n coefficients set to the values w(n), which were determined by RLS function block 438 of RLS processing block 424 of FIG. 4. The reference input signal received at second input 504 is filtered through FIR filter 506 with the resulting filtered signal being supplied at a negative input 508 of summation block 510.

As such, the filtered reference signal output by FIR filter 506, which represents the range profile of interference generated by the bumper reflection and component coupling across the desired range (e.g., 0 m to 0.25 m), is subtracted (i.e., as it is supplied at negative input 508) from the truncated portion of the reference signal received at first input 502. The resulting output signal $\hat{S}_{RX}$ (illustrated by waveform 512) is therefore a modified range profile in which the interference has been removed or subtracted. As such the output signal $\hat{S}_{RX}$ represents the truncated portion of the range profile in which the interference has been removed and that properly depicts the environment in proximity to the automotive radar system. The FIR filter 506, with filter coefficients configured to generate the modified range profile $\hat{S}_{RX}$ can then be convolved with the full reference signal $S_{Ref}$ and subtracted from the original input range profile to generate a full range profile that has been modified to remove or reduce interference.

For further illustration and with reference to waveform 512 shown in FIG. 4, with the bumper and component coupling interference removed, a new target 514 has become apparent and may be detected by a radar controller processor enabling the automotive radar system to alert a driver as to a potential object in the close vicinity of the vehicle's bumper. Prior to removal of the interference caused by transmitting-vehicle bumper reflections and component coupling, that potential target had been obscured and rendered undetectable (see, for example, the original range profile shown by waveform 410 of FIG. 4).

Using this approach, therefore, the near-range interference generated at the location of the vehicle's bumper (e.g., due to the transmitting-vehicle bumper reflection and component coupling) and its corresponding side lobes, can be removed from the range profile generated by the automotive radar system to remove that near-range interference and increase the likelihood that the radar system detects objects that are in close proximity to the vehicle's bumper.

Figure 7:
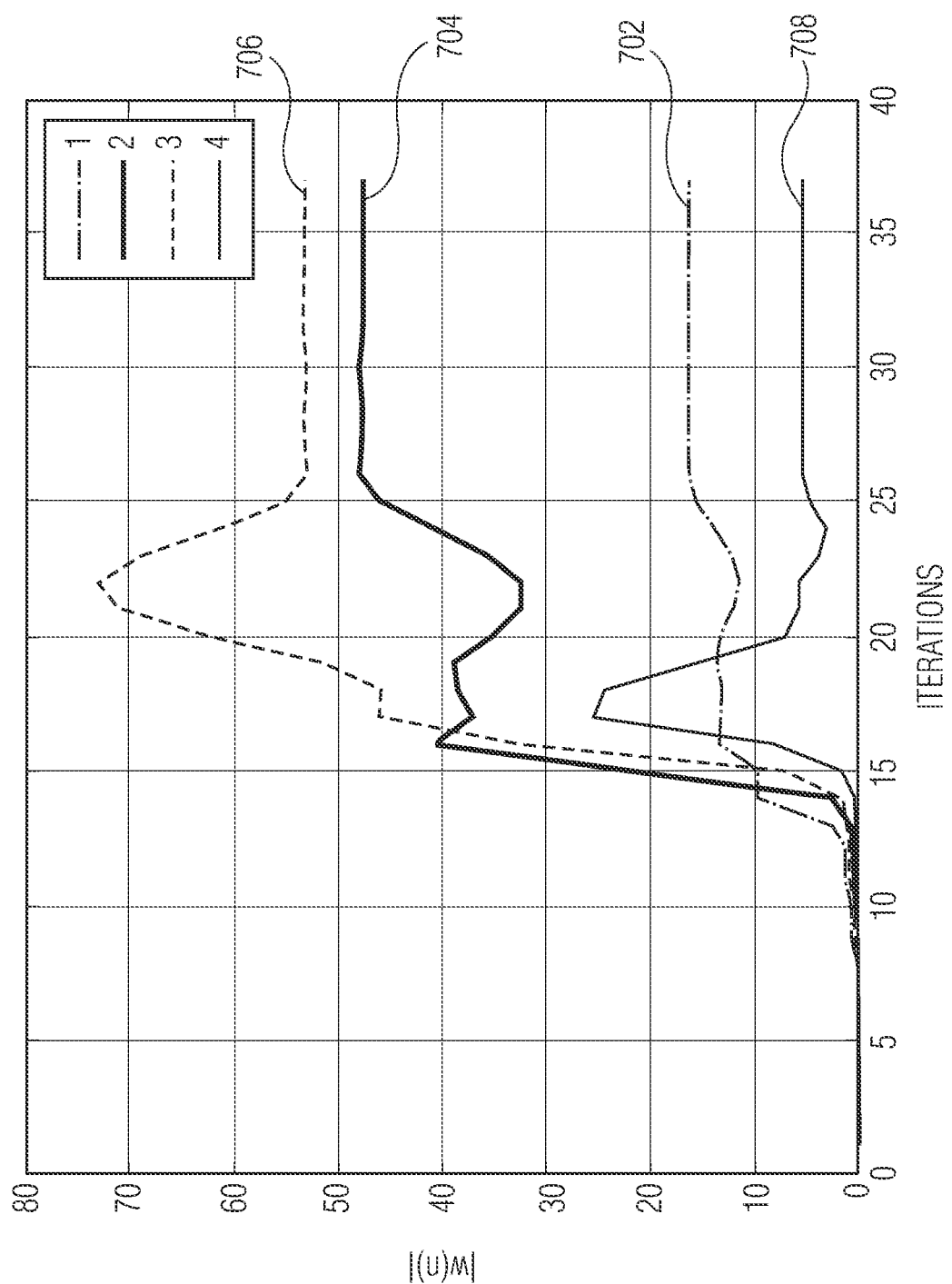
FIG. 7 is a graph depicting the values of coefficients of an example FIR filter that may be used to process the input signal and the reference signal depicted in FIG. 6.

To illustrate the efficiency of this approach, FIG. 6 depicts three charts showing example waveforms for the input signal $S_{RX}$ 602, the reference signal SRef 604, and the resulting processed signal $\hat{S}_{RX}$ 606. In FIG. 6, these signals have been truncated and wrapped, such that the range profile has data in some of the negative range bins. Within each chart, the horizontal axis represents samples (e.g., distance), while the vertical axis represents the magnitude of the respective signal at that particular distance. Because the signals are complex, they have values extending in the negative distance, but the vertical lines 608, 610 in the charts showing input signal $S_{RX}$ 602 and reference signal $S_{Ref}$ 604, respectively, represents the first sample of the range profile (e.g., the 0 m point of each profile). FIG. 7 is a graph depicting the values of coefficients of an example FIR filter (e.g., FIR filter 432) that may be used to process the input signal $S_{RX}$ 602 and the reference signal SRef 604 in accordance with the methods described herein. In this example, the FIR filter has four coefficients with values represented by lines 702, 704, 706, and 708 in the charge of FIG. 7. In FIG. 7, the vertical axis represents the values of the coefficients, while the horizontal axis represents the iteration number of the RLS algorithm being implemented (e.g., by RLS function block 438) to determine the coefficient values.

As illustrated in FIGS. 6 and 7, vertical lines 608, 610 represent the first sample (e.g., at 0 m) from each range profile, corresponding to the first filter coefficient value indicated by line 702 (i.e., w(1)). The second sample in the range profiles corresponds to filter coefficient value indicated by line 704 (i.e., w(2)) and is centered at δr meters. The third sample in the range profiles corresponds to filter coefficient value indicated by line 706 (i.e., w(3)) which estimates targets up to 2δr meters. The fourth sample in the range profiles corresponds to filter coefficient value indicated by line 708 (i.e., w(4)), which estimates targets up to 3δr.

As illustrated by FIG. 7, the values of the filter coefficients w(n) converge quickly after about 25 iterations of the RLS algorithm.

The signal processing method described herein and illustrated by the signal processing chains of FIGS. 4 and 5 may be performed by a radar controller processor (e.g., radar controller processor 304 of FIG. 3) in any suitable environment. In some embodiments, functionality of components that are depicted as being separate elements of the signal processing chain (e.g., FIR filter 432 of FIG. 4 and FIR filter 506 of FIG. 5) may instead be combined into single elements within the radar controller processor. In some embodiments, portions of the signal processing chain may be performed by components (e.g., other vehicle controllers or processor, or even remote processing systems) that are external to the automotive radar system itself.

The signal processing chain illustrated by FIGS. 4 and 5 and described above is configured to process a received radar signal. The received signal can be expressed as the convolution between the transmitted signal chirp$_{TX}$, and the channel response h$_c$ plus noise (e.g., signal interference cause by transmitting-vehicle bumper reflection and component coupling) according to the following expression:

$$\text{chirp}_{RX} = \text{chirp}_{TX} * h_c + \text{noise} \quad (1)$$

As described herein, that received chip signal chirp$_{RX}$ is processed to generate a received base-band signal, $s_{RX}$, which has a frequency that linearly depends on the range of the reflecting object or target. As such, h$_c$, the channel response, has a direct impact on the frequency spectrum of $s_{RX}$, such that the n$^{th}$ sample of h$_c$ affects the n$^{th}$ sample of $S_{RX}$, where $S_{RX}$ is defined as the Fourier Transform of $s_{RX}$, and where $T_w$ is the taper window.

$$S_{RX} = FFT\{s_{RX} T_w\} \quad (2)$$

Accordingly, each sample of the channel response h$_c$ will generate a Point Spread Function $S_{Ref}$ centered at the equivalent range cell. The reference PSF, which represents the interference created by transmitting-vehicle bumper and component coupling interference is therefore computed as:

$$S_{Ref} = FFT\{T_w\} \quad (3)$$

The application of the taper window $T_w$ can reduce the likelihood that the reference PSF changes depending on the frequency bin as a result of sampling errors. To illustrate, a perfectly sampled sine wave has a Fourier Transform containing a single non-zero sample. If the sampling is not perfectly matched, the Fourier Transform will instead be a sinc function, which can degrade the effectiveness of the present interference mitigation technique.

In this approach, the signals $S_{Ref}$ and $S_{RX}$ are sparse, meaning that the signals of interest are concentrated in only a few samples (e.g., those samples associated with locations in close proximity to the vehicle bumper). As described herein, because the region of interest is relatively small (e.g., less than 0.5 m out of the entire range profile which may cover several tens of meters), it is possible to reduce the complexity of the disclosed signal processing chains by analyzing only the first few samples of each of signals $S_{Ref}$ and $S_{RX}$.

After the signals $S_{Ref}$ and $S_{RX}$ are processed according to the methods described above to achieve RLS convergence and a determination of the final FIR filter coefficients, w, the filter coefficients w should match the true RF channel response, $h_c$, such that $w=h_c$.

With the filter coefficients determined, therefore, the near-range interference caused by bumper reflections and component coupling can be removed from the input signal range profile by subtracting $S_{Ref}*w$ from the frequency spectrum of $s_{RX}$, the range profile $S_{RX}$, wherein $\hat{S}_{RX}$ is the corrected range profile:

$$\hat{S}_{RX}=S_{RX}-S_{Ref}*w \quad (4)$$

The total complexity of this approach is given by the number of iterations performed by the RLS function multiplied by the complexity of the RLS filter and by the complexity of the convolution $S_{Ref}*w$. In a typical embodiment, the FIR filter may have 2 to 4 coefficients (though other FIR filters having different numbers of coefficients may be utilized) and require 8 iterations to achieve convergence, with $N_s=512$ FFT points, where $N_s$ is the number of samples within the uncropped input range profile. This results in a total complexity for this example of:

$$PN(5N^2+6N)+N_s+N(N-1)N_s=512+512+1536 \quad (5)$$

When implementing the present algorithm, there is a possibility that $S_{Ref}$ does not perfectly match the target signature for bumper reflection and component coupling due to the sinc interpolation that is caused when the target is not located precisely on the FFT grid. Because the method is extremely fast, it may be possible to mitigate this problem by periodically implementing a calibration routine where a series of different $S_{Ref}$ values (e.g., using different amounts of zero padding) to identify an $S_{Ref}$ value that results in minimized total energy in the range profile in the range bins of interest (e.g., ranges over which interference is expected). That $S_{Ref}$ value can then be used for routine signal processing Generally, if the order of the FIR filter is large enough (e.g., the number of coefficients w in the filter is sufficiently large) or if the tapering window is sufficiently wide, the sinc mismatch can be compensated for within the RLS adaptive algorithm.

Figure 8:
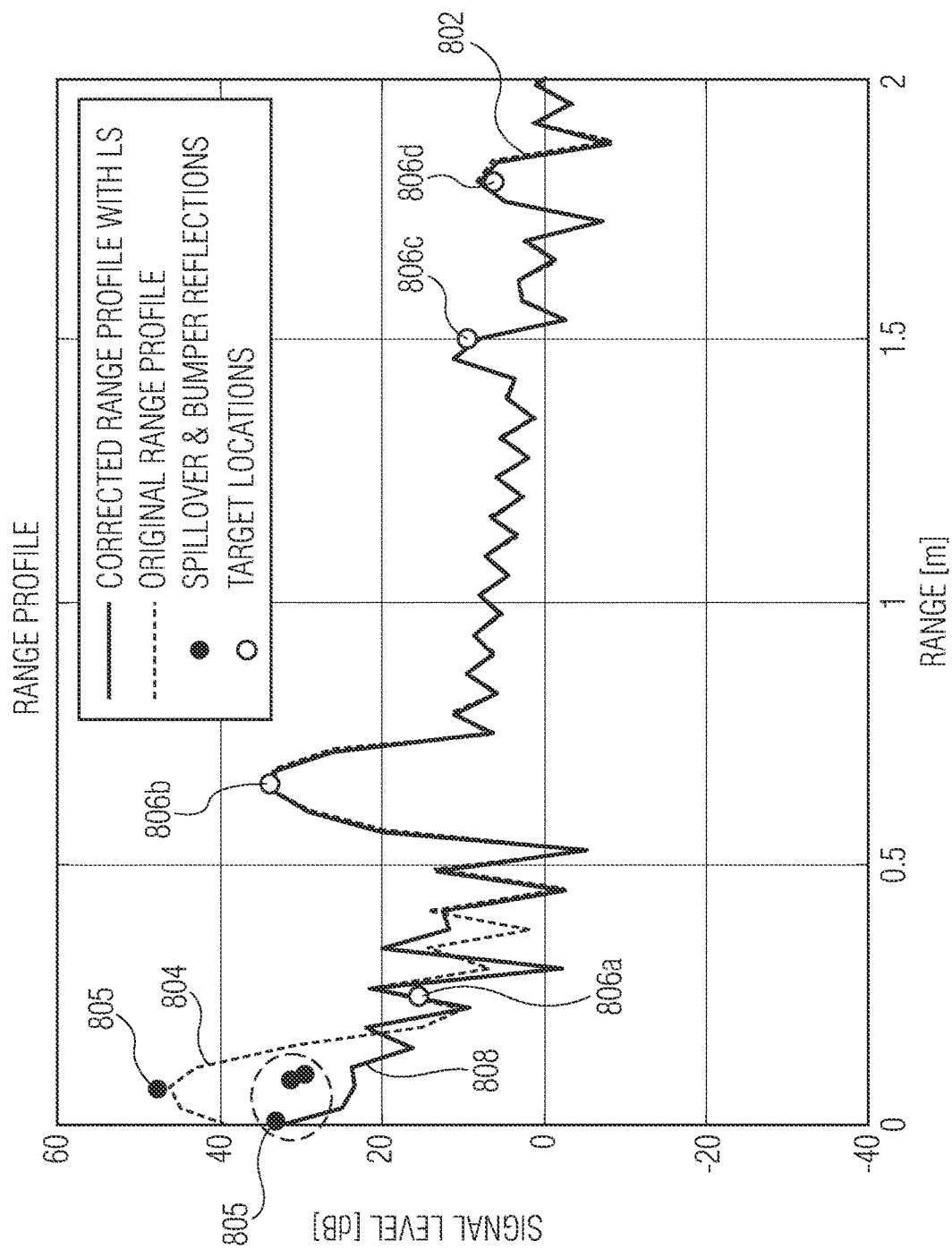
FIG. 8 depicts a typical range profile of a reflected radar signal captured by an automotive radar system.

The signal processing algorithm described herein, which utilizes RLS algorithmic processing, can be more effective at reducing near range signal interference as compared to conventional approaches for radar signal processing. To illustrate, FIG. 8 depicts a typical range profile of a reflected radar signal captured by an automotive radar system. The horizontal axis represents distance from the radar system's transmit and receive antennas measured in meters (m). The vertical axis represents the magnitude of the range profile signal level measured in decibels (dB) at a given distance. In FIG. 8, line 802 represents that the range profile signal as it would be generated by a conventional automotive radar system implementing conventional signal processing approaches. As illustrated, at shorter distances (e.g., ranging from 0 m to about 0.25 m), the range profile depicted by line 802 has a large peak 804. Peak 804 is generated by the portion of the received radar signal that was reflected from the vehicle's bumper and generated by component coupling. Those reflections are indicated by dots 805.

Within FIG. 8, for example, a number of objects were present in the vicinity of the radar system as indicated by dots 806a-806d. As shown, the large peak 804 in line 802 created by bumper reflection and coupling obscures the peak in the range profile signal created by the object represented by dot 806a.

Line 808 represents depicts the results of interference mitigation that may result from conventional approaches, such as least squares methods, for interference mitigation.

Figure 9:
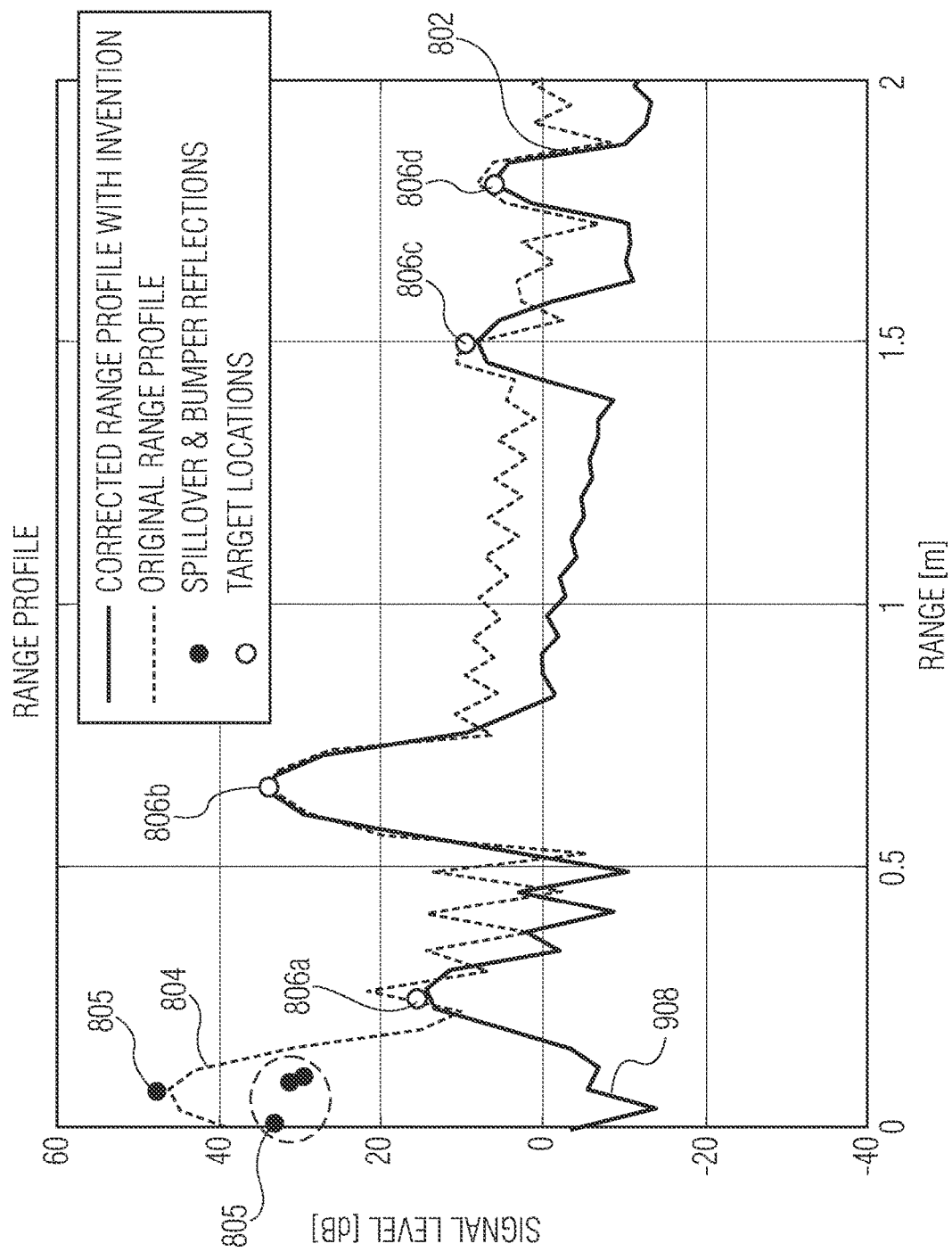
FIG. 9 depicts the range profile of FIG. 8 in which near-range interference has been removed using the signal processing flow of the present disclosure.

This is in contrast to the example depicted in FIG. 9 in which the example of FIG. 8 is processed. However, in FIG. 9 the input signal is processed according to the RLS algorithm described herein to generate line 908, which depicts the results of interference mitigation according to the present disclosure. As illustrated, the magnitude of line 908 is significant reduced at ranges from 0 m to about 0.2 m as compared to the conventional approach depicted by line 808 of FIG. 8, which results in a higher likelihood of the object associated with dot 806a being detected and the vehicle operator (or an automated control system within the vehicle) being appropriate alerted.

An embodiment of the present disclosure relates to an automotive radar system, including: at least one transmitter and at least one receiver, wherein the at least one transmitter and the at least one receiver are configured to transmit and receive radar signals, wherein the at least one transmitter and the at least one receiver are coupled to a vehicle; and an automotive radar processor, configured to perform steps including: receiving, from the at least one receiver, a received radar signal, converting the received radar signal into an input signal range profile, wherein the input signal range profile includes near-range interference signals generated by reflections from a bumper of the vehicle and system component spill-over effects, determining a reference signal, converting the reference signal into a reference signal range profile by performing steps including: applying a tapering window to the reference signal to generate a tapered reference signal; and applying a matched filter to the tapered reference signal to generate the reference signal range profile, executing a recursive least squares operation to determine coefficient values of a finite impulse response (FIR) filter, wherein the coefficient values are selected to minimize an error between the input signal range profile and the reference signal range profile when the reference signal range profile is filtered through the FIR filter, applying the FIR filter with the coefficient values to the reference signal range profile to determine a filtered reference signal range profile, and subtracting the filtered reference signal range profile from the input signal range profile to remove the near-range interference signals from the input signal range profile.

Another embodiment of the present disclosure relates to a signal processing system, including: a first input configured to receive an input signal range profile, the input signal range profile including near-range interference signals; a second input configured to receive a reference signal range profile; and a processor configured to perform steps including: executing a recursive least squares operation to determine coefficient values of a finite impulse response (FIR) filter, wherein the coefficient values are selected to minimize a difference between the input signal range profile and the reference signal range profile when the reference signal range profile is filtered through the FIR filter to generate a filtered reference signal range profile, and subtracting the filtered reference signal range profile from the input signal range profile to remove the near-range interference signals from the input signal range profile.

Another embodiment of the present disclosure relates to a method, including: converting a received radar signal into an input signal range profile; applying a tapering window to a reference signal to generate a tapered reference signal; applying a fast Fourier transform to the tapered reference signal to generate a reference signal range profile; executing a recursive least squares operation to determine coefficient values of a finite impulse response (FIR) filter, wherein the coefficient values are selected to minimize a difference between the input signal range profile and the reference signal range profile when the reference signal range profile is filtered through the FIR filter to generate a filtered reference signal range profile; and subtracting the filtered reference signal range profile from the input signal range profile to remove near-range interference signals from the input signal range profile.

Although the examples have been described with reference to automotive radar systems, the systems and methods described herein may be implemented in conjunction with other types of radar systems. Devices or components described as being separate may be integrated in a single physical device. Also, the units and circuits may be suitably combined in one or more semiconductor devices. That is, the devices described herein may be implemented as a single integrated circuit, or as multiple integrated circuits.

The preceding detailed description is merely illustrative in nature and is not intended to limit the embodiments of the subject matter or the application and uses of such embodiments.

As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

The connecting lines shown in the various figures contained herein are intended to represent exemplary functional relationships and/or physical couplings between the various elements. It should be noted that many alternative or additional functional relationships or physical connections may be present in an embodiment of the subject matter. In addition, certain terminology may also be used herein for the purpose of reference only, and thus are not intended to be limiting, and the terms "first", "second" and other such numerical terms referring to structures do not imply a sequence or order unless clearly indicated by the context.

As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common node).

The foregoing description refers to elements or nodes or features being "connected" or "coupled" together. As used herein, unless expressly stated otherwise, "connected" means that one element is directly joined to (or directly communicates with) another element, and not necessarily mechanically. Likewise, unless expressly stated otherwise, "coupled" means that one element is directly or indirectly joined to (or directly or indirectly communicates with, electrically or otherwise) another element, and not necessarily mechanically. Thus, although the schematic shown in the figures depict one exemplary arrangement of elements, additional intervening elements, devices, features, or components may be present in an embodiment of the depicted subject matter.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. An automotive radar system, comprising:
   at least one transmitter and at least one receiver, wherein the at least one transmitter and the at least one receiver are configured to transmit and receive radar signals, wherein the at least one transmitter and the at least one receiver are coupled to a vehicle; and
   an automotive radar processor configured to:
   receiving, from the at least one receiver, a received radar signal;
   convert the received radar signal into an input signal range profile, wherein the input signal range profile includes near-range interference signals generated by reflections from a bumper of the vehicle and system component spill-over effects;
   determine a reference signal;
   convert the reference signal into a reference signal range profile by:
   applying a tapering window to the reference signal to generate a tapered reference signal; and
   applying a matched filter to the tapered reference signal to generate the reference signal range profile;
   execute a recursive least squares operation to determine coefficient values of a finite impulse response (FIR) filter, wherein the coefficient values are selected to minimize an error between the input signal range profile and the reference signal range profile when the reference signal range profile is filtered through the FIR filter;
   apply the FIR filter with the coefficient values to the reference signal range profile to determine a filtered reference signal range profile; and
   subtract the filtered reference signal range profile from the input signal range profile to remove the near-range interference signals from the input signal range profile.

2. The automotive radar system of claim 1, wherein the reference signal has a predetermined value and the automotive radar processor is configured to perform the step of determining the reference signal by retrieving the reference signal from a memory system accessible to the automotive radar processor.

3. The system of claim 1, wherein the automotive radar processor is configured to perform the step of executing a fast-time matched filter to perform range compression on the received radar signal before converting the received radar signal into the input signal range profile.

4. The system of claim 3, wherein the automotive radar processor is configured to perform the step of executing a slow-time frequency Fourier transform to perform Doppler compression on the received radar signal before converting the received radar signal into the input signal range profile.

5. The automotive radar system of claim 1, wherein the tapering window is a Taylor tapering window or a Blackman tailoring window.

6. The automotive radar system of claim 1, wherein a number of coefficients n in the FIR filter is at least partially determined by a distance between at least one of the at least one transmitter and the at least one receiver and an edge of the bumper of the vehicle.

7. The automotive radar system of claim 6, wherein the number of coefficients n in the FIR filter is determined as a smallest integer that is larger than a ceiling of $$N = \frac{R_e}{\delta r}$$

where N is a number of samples of the input signal range profile, $R_e$ is the distance, and $\delta r$ is a range cell.

8. The automotive radar system of claim 7, wherein the number of coefficients n in the FIR filter is fewer than the number of samples of the input signal range profile N divided by $$4\left(n < \frac{N}{4}\right).$$

9. The automotive radar system of claim 1, wherein the automotive radar system is a frequency-modulated continuous-wave (FMCW) radar system.

10. A signal processing system, comprising:
a first input configured to receive an input signal range profile, the input signal range profile including near-range interference signals;
a second input configured to receive a reference signal range profile; and
a processor configured to:
execute a recursive least squares operation to determine coefficient values of a finite impulse response (FIR) filter, wherein the coefficient values are selected to minimize a difference between the input signal range profile and the reference signal range profile when the reference signal range profile is filtered through the FIR filter to generate a filtered reference signal range profile; and
subtract the filtered reference signal range profile from the input signal range profile to remove the near-range interference signals from the input signal range profile.

11. The signal processing system of claim 10, wherein a number of coefficients n in the FIR filter at least partially determined by a distance between at least one a transmitter of a radar system and a receiver of the radar system and an edge of a bumper of a vehicle.

12. The signal processing system of claim 11, wherein the number of coefficients n in the FIR filter is determined as a smallest integer that is larger than a ceiling of $$N = \frac{R_e}{\delta r}$$

where N is a number of samples of the input signal range profile, $R_e$ is the distance, and $\delta r$ is a range cell.

13. The signal processing system of claim 12, wherein the number of coefficients n in the FIR filter in fewer than the number of samples of the input signal range profile N divided by $$4\left(n < \frac{N}{4}\right).$$

14. A method, comprising:
converting a received radar signal into an input signal range profile;
applying a tapering window to a reference signal to generate a tapered reference signal;
applying a fast Fourier transform to the tapered reference signal to generate a reference signal range profile;
executing a recursive least squares operation to determine coefficient values of a finite impulse response (FIR) filter, wherein the coefficient values are selected to minimize a difference between the input signal range profile and the reference signal range profile when the reference signal range profile is filtered through the FIR filter to generate a filtered reference signal range profile; and
subtracting the filtered reference signal range profile from the input signal range profile to remove near-range interference signals from the input signal range profile.

15. The method of claim 14, wherein the reference signal has a predetermined value and further comprising retrieving the reference signal from a memory system.

16. The method of claim 14, further comprising executing a fast-time frequency Fourier transform to perform range compression on the received radar signal before converting the received radar signal into the input signal range profile.

17. The method of claim 16, further comprising executing a slow-time frequency Fourier transform to perform Doppler compression on the received radar signal before converting the received radar signal into the input signal range profile.

18. The method of claim 14, wherein the tapering window is a Taylor tapering window or a Blackman tailoring window.

19. The method of claim 14, further comprising determining a number of coefficients n in the FIR filter based upon a distance between at least one of a transmitter and a receiver and an edge of a bumper of a vehicle.

20. The method of claim 19, further comprising determining the number of coefficients n using a smallest integer that is larger than a ceiling of $$N = \frac{R_e}{\delta r}$$

where N is a number of samples of the input signal range profile, $R_e$ is the distance, and $\delta r$ is a range cell.

* * * * *